Patented Aug. 29, 1939

2,171,166

UNITED STATES PATENT OFFICE 2,171,166

CONDENSATION PRODUCT FROM P-DI-CHLORBENZOL AND SULPHURIC ANHYDRIDE AND ITS DERIVATIVES

Willy Seel, Milan, Italy

No Drawing. Application February 27, 1935, Serial No. 8,506. In Germany March 2, 1934

8 Claims. (Cl. 260—457)

This invention relates to novel organic compounds and to processes for preparing the same. More particularly, this invention deals with novel compounds obtained by treatment of dichlorobenzenes with sulphuric anhydride, and with further compounds obtainable by condensing the aforesaid novel compounds with organic or inorganic compounds having a readily exchangeable hydrogen atom.

It is an object of this invention to produce novel organic compounds which are useful in the various technical arts such as the treatment of textile fibers, pest control, and manufacture and application of dyestuffs. It is a further object of this invention to provide a novel process for inducing a reaction between dichlorobenzene and sulphuric anhydride whereby to produce novel compounds. Other and further important objects of this invention will appear as the description proceeds.

It has been believed in the art that p-dichlorobenzene is incapable of sulphonation except under very stringent conditions, and even then but very poorly. (Beilstein, 3d. ed., Vol. II, page 119, paragraph 2; Zeitsch. für Chemie, 1868, vol. 4, page 226; Monatshefte der Chemie, 1927, vol. 48, page 627.)

I have now found that when para-dichlorbenzene is treated under certain conditions with oleum, as more fully set forth below, it forms a homogeneous condensation product consisting of 3 mols of $SO_3$ and 2 mols of para-dichlorbenzene with the loss of one molecule of water. The product thus obtained appears to have the following constitution

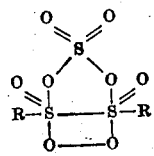

and may be designated bis-(2,5-dichlorobenzene-4-sulphonic acid anhydride)-sulphone.

Products of this type have not as yet been described in the literature. It is true that certain organic compounds on sulphonation give intermediate products to which the $SO_3$ radical is attached; these are, however, unstable. The above product, however, is so stable that it can be readily isolated, washed and dried. Contrary to the known p-dichlorbenzol-sulphonic acid the new product of bis-(2,5-dichlorobenzene-4-sulphonic-acid-anhydride)-sulphone is insoluble in water. It decomposes only after several hours' heating in the presence of water, whereupon it breaks up quantitatively to form one mol of $H_2SO_4$ and 2 mols of para-dichlorbenzene sulphonic acid by adding 2 mols of water. Furthermore, this product, contrary to all expectation, readily forms condensation products in which the sulphate-radical is replaced by an inorganic or organic group, by splitting off sulphuric acid. These condensation products are suitable for many and varied technical uses. According to the choice of the compound used for the condensation, products are obtained which are useful as insecticides, textile assistants, or dye intermediates.

The special conditions above referred to consist of using a relatively concentrated sulphonating agent while avoiding elevated temperatures. Oleum of at least 10% strength should be used as the sulphonating agent. Best results are obtained with 30% oleum, but higher concentrations up to the strongest commercial grades are applicable. The temperature during sulphonation should be kept below 100° C. Best results are obtained at room temperature or lower.

Of the materials capable of condensing with my novel reaction product may be mentioned the organic amines, amides, imines, alcohols, mercaptans, phenols, carboxylic acids, aldehydes, sulphonic acids, sulphinic acids, sulphamides and the various salts of these, and also inorganic hydroxy compounds such as arsenious acid, arsenic acid, the corresponding acids of phosphorus, antimony, bismuth, and nitrogen; salts of these; ammonia and its derivatives; derivatives of cyanogen, etc. In condensations of this type the radical $SO_4$ appears to be eliminated and two radicals of the organic or inorganic compound seem to take its place, as is illustrated by the following equation which is believed to represent the reaction between bis-(2,5-dichlorobenzene-4-sulphonic-acid-anhydride)-sulphone and aniline.

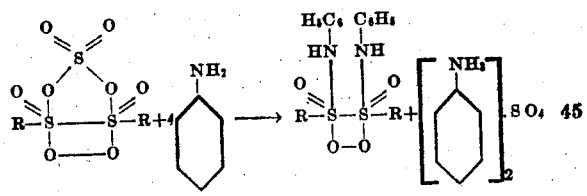

The intermediate sulphone and its condensation products as above described are useful for various purposes such as insecticides, fungicides, assistants in the treatment of textile material, oxidizing agents for use in printing with vat dyestuffs, intermediates for the manufacture of various dyestuffs, etc.

As insecticides, my novel products are particularly useful for moth-proofing textile fabric, especially wool. Here, they have the advantage of not being volatile; hence neither weakening with age nor spreading poisonous fumes. Furthermore, they do not wash out readily from the fiber. They are, however, inert with respect to other operations to which the textile material may be subjected and therefore do not interfere with such.

My novel products are also useful as intermediate for colors of the Supramine as well as Thioindigoid types. They are capable of changing the shade of azo dyestuffs, and remarkably increase the fastness to light and washing as well as the purity of the shade obtained by dyeing with such colors.

The anhydride-sulphone is also advantageously used as an oxidizing agent in the printing of wool with vat dyestuffs, and they have the advantage over persulphates or acids in that they give off $H_2SO_4$ but slowly.

Without limiting my invention to any particular procedure, the following examples are given to illustrate my preferred embodiments thereof. Parts mentioned are by weight.

Example 1

50 parts of para-dichlorbenzene are added to 200 parts of 30% oleum at a temperature of about 15° C. The temperature is raised with good agitation to about 25° C., which temperature is maintained for 10 hours. The reaction mixture is then poured into a mixture of 200 parts of water and 300 parts of ice and the product which separates is filtered off, washed until neutral, and dried. It is in the form of a white powder which melts at 108–115° C. The amount and strength of the oleum can be varied within wide limits. The same is true of the temperature. Also molten para-dichlorbenzene can be added to the oleum or the oleum may be added to molten para-dichlorbenzene; if desired, the para-dichlorbenzene can be added in solution or in the presence of diluents, or the oleum may be added to such solutions or dilutions of para-dichlorbenzene. If desired, free sulphuric acid anhydride may be used in place of oleum.

The product thus obtained is believed to be bis(2,5- dichlorobenzene -4- sulphonic-acid-anhydride)-sulphone corresponding to the above formula. Upon boiling in water it decomposes into sulphuric acid and p-dichlorobenzene-sulphonic acid. It behaves toward amines in the same manner as a sulphone chloride; that is, it condenses to give a sulphonamide as indicated by the equation above. When treated with reducing agents, according to the methods of reducing aryl-sulphone-chlorides, it yields sulphinic acids and mercaptans. Analysis of the product gave the following results:

|  | Computed for $2C_6H_4Cl_2.3SO_2$—$H_2O$ | Found |
| --- | --- | --- |
|  | Percent | Percent |
| Oxygen | 24.91 | 24.87 |
| Sulphur | 18.65 | 18.60 |
| Chlorine | 27.24 | 27.32 |
| Carbon | 28.01 | 27.96 |
| Hydrogen | 1.17 | 1.22 |

Example 2

26 parts of the product obtained according to Example 1 are suspended in 200 parts of toluol. 9.3 parts of aniline are added together with 8.5 parts of molten sodium acetate. The mixture is heated 6 hours under reflux and after distillation of the toluol is diluted with water and filtered. After drying, the product is a white crystalline powder. In place of toluol other solvents may be used, or the condensation may be carried on in a melt without the use of solvents, or in aqueous solution. In place of sodium acetate other salts or acid-binding materials may be used. The aniline may be replaced by other aliphatic and aromatic amines, diamines, hydrazines, sulphamines, sulphamides, or by secondary amines, or by derivatives of the above compounds.

Example 3

26 parts of the product obtained according to Example 1 are added to 50 parts of butyl alcohol, after which 8.5 parts of molten sodium acetate are added and the mass is boiled under reflux for 6 hours. The excess alcohol is distilled off; 100 parts of water are added, and the mixture is cooled and filtered. After drying, the product is in the form of a crystalline powder. In place of butyl alcohol other aliphatic, aromatic or mixed aliphatic-aromatic alcohols may be employed as well as aldehydes, carboxylic acids, hydroxy-carboxylic acids, phenols and and their derivatives.

Example 4

26 parts of the product obtained according to Example 1 are heated for 2 to 3 hours at 95° C. with 14 parts of the sodium salt of benzol sulphinic acid. The melt becomes fluid for a time but solidifies again at the end of the reaction. 100 parts of water are added, the mixture is cooled with stirring and the crystallized, colorless product is filtered off. In place of the sulphinic acid, thiophenols, mercaptans, or their derivatives of the aliphatic or aromatic series may be used.

Example 5

26 parts of the product obtained according to Example 1 are added to 200 parts of water and to this are added 35 parts of 1.8.3.6-amino-naphthol-disulphonic-acid sodium-salt and 13 parts of crystallized sodium acetate. The mix is heated 6 hours to boiling, acidified and filtered hot. H-acid remains on the filter while the product is in solution. It crystallizes on cooling. In the place of H-acid it is possible to use other amino-naphthol-disulphonic acids, amino-naphthol monosulphonic acids, amino-naphthols, naphthylamines, naphthalene-diamines, naphthols, hydroxy naphthalenes, and their derivatives. The temperature of the condensation reaction and the amounts of solvents can be varied within wide limits.

Example 6

26 grams of the product obtained according to Example 1 are mixed with a solution which contains 200 grams of water, 7 grams of arsenious acid and 13 grams of NaOH (35° Bé.). The mixture is boiled 10 hours under reflux until everything is in solution. It is then filtered from the small amount of insoluble residue and the filtrate is cooled. The reaction product crystallizes in the form of leaflets. Its melting point is above 250° C.; at this temperature it starts to sublime. In place of arsenious acid it is possible to use other arsenic derivatives or derivatives of phosphorus, antimony, nitrogen, bismuth and cyanogen. Ammonia and derivatives thereof may likewise be employed.

It will be understood that my invention is susceptible of variations and modifications within wide limits, without departing from the spirit thereof.

Thus, while I preferred in Examples 2 to 6 to carry out the condensation near the boiling point of the mixture, this temperature was employed only as a matter of convenience. For instance, the novel anhydride-sulphone reacts readily with aniline when brought together even in the cold.

Similarly, stoichiometric proportions were employed in some of the examples for the sake of convenience, but, as illustrated in Example 3, this limitation is not absolutely essential.

I claim:

1. The process of producing a novel organic compound which comprises reacting p-dichlorobenzene with 30% oleum at a temperature between 15 and 25° C., diluting the reaction mass with cold water and recovering the solid reaction product.

2. The new chemical compound represented by the structural formula

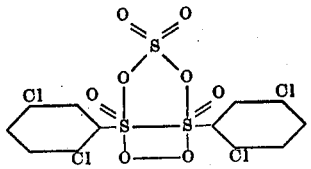

3. The process which comprises reacting p-dichloro-benzene with a sulphonating agent containing over 10% free $SO_3$ at a temperature of about 15° C. to about 25° C., diluting the reaction mass with cold water, recovering the solid sulphone reaction product, and subsequently reacting said product with a member of the group consisting of lower alkyl, phenyl, and naphthyl compounds containing a labile hydrogen atom.

4. As new chemical compounds, the product represented by the structural formula

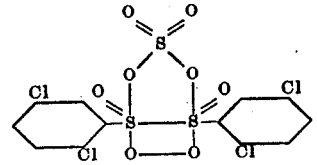

and derivatives thereof in which the $SO_4$ radical is replaced by two identical radicals of the group consisting of monovalent substituted lower alkyl, phenyl and naphthyl compounds in which the substituent comprises a member of the group consisting of hydroxy, oxy, amino and sulpho groups.

5. As new chemical compounds, the product represented by the structural formula

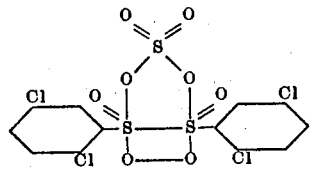

and derivatives thereof in which the $SO_4$ radical is replaced by two identical radicals of an aromatic amine.

6. As new chemical compounds the product represented by the structural formula

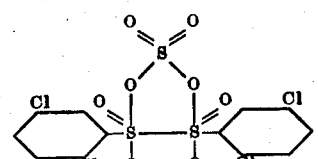

and derivatives thereof in which the $SO_4$ radical is replaced by two identical radicals if a lower aliphatic alcohol.

7. The new chemical compound represented by the structural formula

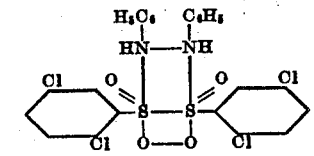

8. The new chemical compound represented by the structural formula

WILLY SEEL.